United States Patent [19]

Sasaki

[11] Patent Number: 5,229,859
[45] Date of Patent: Jul. 20, 1993

[54] IMAGE PICKUP APPARATUS FOR FULL LINE READING

[75] Inventor: Takashi Sasaki, Omiya, Japan

[73] Assignee: Ricoh Company, Ltd., Tokyo, Japan

[21] Appl. No.: 766,216

[22] Filed: Sep. 27, 1991

[30] Foreign Application Priority Data

Oct. 25, 1990 [JP] Japan .................. 2-285886

[51] Int. Cl.⁵ .................. H04N 5/335
[52] U.S. Cl. .................. 358/213.26; 358/43
[58] Field of Search .................. 358/213.26, 213.27, 358/213.11, 43, 44, 213.28

[56] References Cited

U.S. PATENT DOCUMENTS 4,757,377 7/1988 Takanashi et al. .................. 358/47
5,034,805 7/1991 Ishizaka .................. 358/44

FOREIGN PATENT DOCUMENTS 213955A 3/1987 European Pat. Off. .
61-102888 5/1986 Japan .
62-277881 12/1987 Japan .

Primary Examiner—Michael T. Razavi
Assistant Examiner—Tuan V. Ho
Attorney, Agent, or Firm—Oblon, Spivak, McClelland, Maier & Neustadt

[57] ABSTRACT

An image pickup apparatus which is capable of full line reading, comprises a line delay device, a picture element delay device, a switching device, and an adding device. The line delay device delays an output of an image pickup element for one line. The picture element delay device delays the output delayed for one line for one picture element. The switching device selects the output either of the line delay device or of the picture element delay device and outputs the selected output. Furthermore, the switching device is adapted to supply the selected output for the adding device at every two lines in a cycle of four lines. The adding device adds the output of the switching device to the output of the image pickup element and outputs the added output.

5 Claims, 2 Drawing Sheets

Fig. 2

|  | S₁ | | S₂ | |
|---|---|---|---|---|
| B₁ ↴ | Ye | Cy | Ye | Cy |
| | Mg | G | Mg | G |
| B₂ ↴ | Ye | Cy | Ye | Cy |
| | G | Mg | G | Mg |
| | Ye | Cy | Ye | Cy |

→ A₁, → A₂, grid labeled 10

Fig. 3

|  | S₁ | | S₂ | |  |
|---|---|---|---|---|---|
| | Ye | Cy | Ye | Cy | C₁ |
| | Mg | G | Mg | G | C₂ |
| | Ye | Cy | Ye | Cy | C₃ |
| | G | Mg | G | Mg | C₄ |
| | Ye | Cy | Ye | Cy | C₅ | grid labeled 10

Fig. 4

| Cy | Ye | Cy | Ye |
|---|---|---|---|
| G | Mg | G | Mg |
| Cy | Ye | Cy | Ye |
| Mg | G | Mg | G |

B ↴ rows; → A₁, → A₂

↓ ↓ ↓ ↓ → Hreg

IMAGE PICKUP APPARATUS FOR FULL LINE READING

BACKGROUND OF THE INVENTION

The present invention relates to an image pickup apparatus applied to a videotape recorder which is equipped with a camera having a digital zoom function and an electronic still camera having a frame electronic shutter function, etc., and the apparatus is equipped with a charge coupled device (CCD) having a complementary color checkered filter.

As for the CCD used in the above image pickup apparatus, a CCD as shown in the technical report of the Television Institute (Page 79-84 of Feb. 28, 1989 issue) is capable of full line reading by increase of the vertical transfer gates from 2 to 3 for one picture element.

And as for the complementary color checkered filter with which the CCD is equipped, there is a color filter arrangement type as shown in FIG. 4 and field reading is carried out as shown in the drawing. In field A, electric charges are mixed in a pair of A1 line or A2 line (In field B, in a pair of B line). Therefore, an order of electric charge coming out of a horizontal shift register (Hreg) as signal in A1 line is $$\{(G+Cy), (Mg+Ye), (G+Cy), (Mg+Ye)\}.$$

A luminance signal (Y signal) and a color difference signal are constructed by treating the above signals. The Y signal is obtained by adding a field pair in the line to a neighboring field pair, and the color difference signal is obtained by taking a field pair in the line from a neighboring field pair. That is, the Y signal is obtained based on the approximate signal shown in the following equation;

$$Y = \{(G + Cy) + (Mg + Ye)\} \times 1/2$$
$$= 1/2\{2B + 3G + 2R\}$$

The color difference signal is obtained based on the approximate signal shown in the following equation;

$$R - Y = \{(Mg + Ye) - (G + Cy)\}$$
$$= \{2R - G\}$$

And in A2 line, an order of a signal coming out of a Hreg is $\{(Mg+Cy), (G+Ye), (Mg+Cy), (G+Ye)\}$. The Y signal constructed with these signals is shown in the following equation;

$$Y = \{(G + Ye) + (Mg + Cy)\} \times 1/2$$
$$= 1/2\{2B + 3G + 2R\}$$

Thus, the Y signal of A1 line and of A2 line are balanced because of the same construction.

Similarly, the color difference signal is approximated by the following equation;

$$-(B - Y) = \{(G + Ye) - (Mg + Cy)\}$$
$$= -\{2B - G\}$$

After all, R-Y and −(B-Y) are obtained as the color difference signal alternately in linear order. Field B is treated in the same manner.

In the above mentioned prior art, when full line reading of CCD, to which color coding is applied by a complementary color checkered filter, is made, color can be demodulated by means of the same color demodulation process as a case of field reading effected by mixing two lines by delaying one horizontal line. However this is the color difference line-sequential system, if line numbers are (n)∼(n−5), the color difference signal is shown as follows;

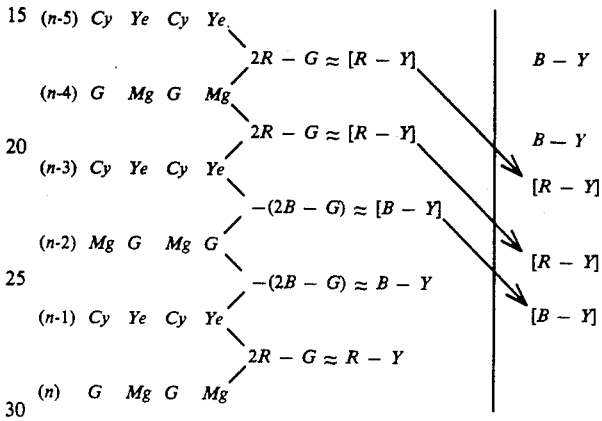

Two kinds of the color difference signals appear in two successive lines alternately like

[R-Y], [R-Y], [B-Y], [B-Y], [R-Y], [R-Y]

Further delay circuitry corresponding to two lines is necessary for synchronization as shown in the above right hand. (The color difference signal in the number n line is composed of [R-Y] obtained from (n) and (n−1) and [B-Y] obtained from (n−2) and (n−3). One line color signal contains four lines of CCD output signals, so there is a problem to cause the deterioration of vertical resolution of the color signal.

SUMMARY OF THE INVENTION

It is therefore an object of the present invention to provide an image pickup apparatus which is able to prevent the deterioration of vertical resolution of the color signal during full line reading.

The object of the invention can be achieved by an image pickup apparatus which is capable of ensuring a full line reading to a cycle of four lines of CCD, comprising a line delay device for delaying an output of an image pickup element for one line, a picture element delay device for delaying the delayed output for one picture element, a switching device for selecting one output of the output of the line delay device and the output of the picture element delay device and for outputting the selected one output, and an adding device for adding the output of the switching device to the output of the image pickup element and for outputting the added output, the switching device being adapted to supply the selected output for the adding device at every two lines in the cycle of four lines.

In the above mentioned apparatus, two kinds of color difference signals can be obtained from each line during full line reading by selecting an output from an output of the line delay device, which is delayed for one line from the output of the image pickup element and an output of the picture element delay device, which is delayed for one picture element from the output of the line delay device, and by adding the selected output to the output of the image pickup element then outputting the added output. Therefore, the color signal is demodulated by three lines of CCD output during color difference synchronization, thereby to prevent the deterioration of vertical resolution of the color signal.

Further objects and advantages of the present invention will be apparent from the following description of the preferred embodiment of the invention as illustrated in the accompanying drawings.

BRIEF DESCRIPTION OF THE DRAWINGS

FIG. 2 and FIG. 3 are charts illustrating a complementary color checkered filter used for CCD in FIG. 1, respectively; and FIG. 4 is a chart illustrating a existing complementary color checkered filter.

DESCRIPTION OF THE PREFERRED EMBODIMENT

Figure 1:
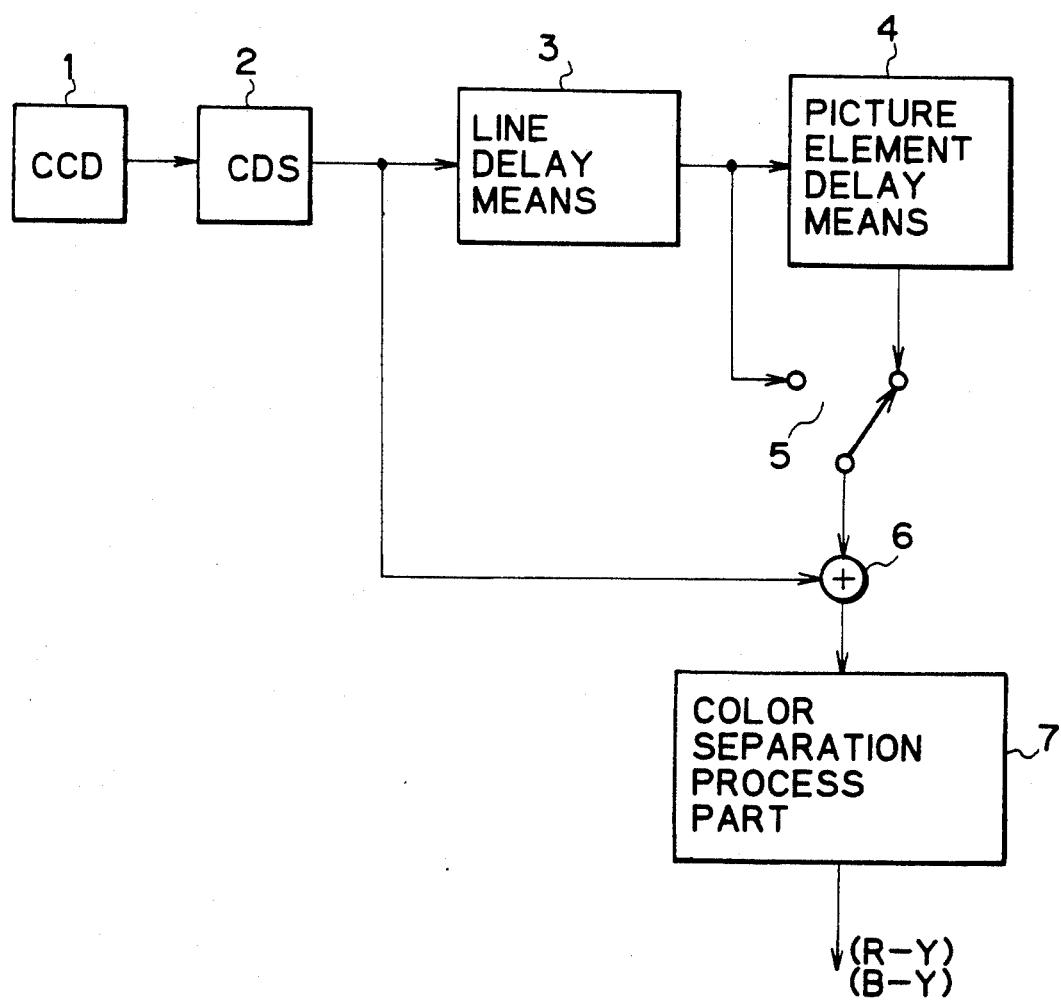
FIG. 1 is a composition view of an embodiment of an image pickup apparatus according to the present invention.

FIG. 1 is a composition view of an embodiment of the present invention showing a CCD 1, a known CDS 2, a line delay means 3 for delaying an output of the CCD from the CDS 2 for one horizontal line, a picture element delay means 4 for delaying the output of the line delay means 3 for one picture element, a switching means 5 for selecting either the output of the line delay means 3 or the output of the picture element delay means 4 and for outputting the selected output, an adding means 6 for adding the output of the switching means 5 to the output of the CCD from CDS 2 and for outputting the added output, and a color separation process part 7 for receiving the output of adding means 6.

FIG. 2 is a chart illustrating a color filter arrangement of the complementary color checkered filter used for the CCD shown in the FIG. 1. This complementary color checkered filter 10 is adapted to obtain a different color difference signal in each line by mixing and reading charges of two lines during normal operation (field reading).

That is, in B1 line;

$$S1 - S2 = (Cy + G) - (Ye + Mg)$$
$$= (B + G + G) - (R + G + R + B)$$
$$= -(2R - G) \approx -(R - Y)$$

And in B2 line;

$$S1 - S2 = (Cy + Mg) - (Ye + G)$$
$$= 2B - G \approx B - Y$$

In A1 line;

$$S1 - S2 = (G + Cy) - (Mg + Ye)$$
$$= -(2R - G) \approx -(R - Y)$$

Further in A2 line;

$$S1 - S2 = (Mg + Cy) - (G + Ye)$$
$$= 2B - G \approx B - Y$$

As shown above, a different color difference signal is produced at each line like (R-Y),(B-Y),(R-Y),(B-Y), ...

During full line reading, instead of mixing two picture elements neighboring up and down in the CCD 1, the following mixing of picture elements is carried out, that is, the switching means 5 is regulated to supply the output of either the line delay means 3 or the picture element delay means 4 to the adding means 6 at every two lines in a cycle of four lines and the output of the adding means 6 is demodulated into two kinds of color differences, which is (R-Y) and (B-Y), at the color separation process part.

FIG. 3 is a chart illustrating a color filter arrangement of the complementary color checkered filter for explaining a color separation of the above mentioned embodiment during full line reading and C1~C5 show line order.

In (C1+C2) line;

$$S1-S2=(Cy+G)-(Ye+Mg)\approx -(R-Y)$$

In [C2 (one picture element delay)+C3] line;

$$S1-S2=(Mg+Cy)-(G+Ye)\approx (B-Y)$$

In [C3 (one picture element delay)+C4] line;

$$S1-S2=(Cy+G)-(Ye+Mg)\approx -(R-Y)$$

In (C4+C5) line;

$$S1-S2=(Mg+Cy)-(G+Ye)\approx B-Y$$

Therefore, the color difference of (R-Y) and (B-Y) can be obtained in each line by the above mentioned steps.

Many widely different embodiments of the present invention may be constructed without departing from the spirit and scope of the present invention. It should be understood that the present invention is not limited to the specific embodiments described in the specification, except as defined in the appended claims.

What is claimed is:

1. An image pickup apparatus comprising:
   an image pickup element having a plurality of lines for generating an output by every one line, said one line having a plurality of picture elements;
   a line delay means for delaying said output from one of said lines by one line;
   a picture element delay means for delaying said one line delayed output by one picture element;
   a selecting means for selecting one of said one line delayed output and said one picture element delayed output and for outputting said selected one; and
   an adding means for adding said selected one to said output from an other line adjacent to said one of said lines from said image pickup element and for outputting said added output,
   said selecting means selecting one of said one line delayed output and said one picture element delayed output in such a manner that two successive color difference signals obtained from said added outputs are different from each other in a case of a full line reading wherein a color separation process circuit generates said color different signals from said added output.

2. An image pickup apparatus according to claim 1, wherein said image pickup element comprises a charge coupled device with a complementary color checkered filter.

3. An image pickup apparatus according to claim 2, wherein said image pickup element includes a correlated double sampling circuit.

4. An image pickup apparatus according to claim 1, wherein said charge coupled device has three vertical transfer gates for one of said picture elements.

5. An image pickup apparatus according to claim 2, wherein said selecting means selects alternately said one line delayed output and said one picture element delayed output at every two lines in a cycle of four successive lines of said charge coupled device.

* * * * *